United States Patent [19]
Montgomery

[11] Patent Number: 6,077,471
[45] Date of Patent: *Jun. 20, 2000

[54] MOLD FOR FORMING A CONTAINER HAVING A CONTINUOUS NECK FINISH AND METHOD FOR USING SAME

[75] Inventor: Gary V. Montgomery, Evansville, Ind.

[73] Assignee: Rexam Plastics Inc., Evansville, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,769

[22] Filed: Jul. 17, 1997

[51] Int. Cl.[7] ................................................ B29C 45/37
[52] U.S. Cl. ................. 264/318; 264/328.1; 425/577; 425/DIG. 58
[58] Field of Search .................. 264/318, 328.1, 264/513, 537; 249/59; 425/577, 533, DIG. 58; 220/304, 288

[56] References Cited

U.S. PATENT DOCUMENTS

| | | | |
|---|---|---|---|
| 2,891,283 | 6/1959 | Cramer et al. | 249/59 |
| 3,020,594 | 2/1962 | Makowski | 249/59 |
| 3,330,006 | 7/1967 | Jenkins | 249/59 |
| 3,843,088 | 10/1974 | McLoughlin et al. | 249/59 |
| 3,926,401 | 12/1975 | Northup | 249/59 |
| 4,090,631 | 5/1978 | Grussen . | |
| 4,134,513 | 1/1979 | Mumford . | |
| 4,209,102 | 6/1980 | Dunn . | |
| 4,210,251 | 7/1980 | Grussen . | |
| 4,276,989 | 7/1981 | Hicks . | |
| 4,322,011 | 3/1982 | Mumford . | |
| 4,371,091 | 2/1983 | Gelina | 220/304 |
| 4,541,795 | 9/1985 | Cole | 249/59 |
| 4,610,372 | 9/1986 | Swartzbaugh . | |
| 4,768,669 | 9/1988 | Kane . | |
| 4,818,213 | 4/1989 | Roy | 425/533 |
| 5,009,323 | 4/1991 | Montgomery . | |
| 5,114,655 | 5/1992 | Cole | 249/59 |
| 5,340,304 | 8/1994 | Nakamura | 425/577 |
| 5,379,910 | 1/1995 | Montgomery . | |
| 5,460,283 | 10/1995 | Macartney . | |

FOREIGN PATENT DOCUMENTS

2641543  3/1977  Germany .

*Primary Examiner*—Jill L. Heitbrink
*Attorney, Agent, or Firm*—Middleton & Reutlinger; Charles G. Lamb

[57] ABSTRACT

A mold for forming a container is provided with an upper die, a lower die, a first semi-cylindrically shaped collar and a second semi-cylindrically shaped collar. The upper die includes a downwardly-depending central core portion which cooperates with a concentric annular lip portion and spaced outwardly from the central core portion defining a groove therebetween sized to provide a continuous neck finish on the container. The lower die is provided with a core-receiving pocket sized to receive the central core portion of the upper die. The first and second collars are disposed in abutting relation and are provided with mating surfaces having thread grooves to form a thread region of the container neck, the first and second collars being sandwiched between the upper and lower dies in a use condition.

5 Claims, 7 Drawing Sheets

MOLD FOR FORMING A CONTAINER HAVING A CONTINUOUS NECK FINISH AND METHOD FOR USING SAME

BACKGROUND OF THE INVENTION

1. Technical Field of the Invention

The present invention relates to molds for forming containers and to methods for using same. More particularly, the present invention relates to molds for forming containers and to methods for using same, wherein a container being formed therefrom is provided with a substantially continuous neck finish.

2. Discussion of the Prior Art

It is often desirable to provide a fluid-impervious seal between a container and a closure fitted thereupon, such as, for example, when the container is filled with a liquid. However, it is often difficult to provide an efficient seal between the container and the closure due to the typically rigid properties of the materials chosen therefor, and also due to the typically large variance in the tolerances between the dimensions of such containers and closures manufactured from such materials.

Further, most containers are typically manufactured by an injection-molding or an extrusion-molding process, which typically imparts a surface discontinuity in the containers manufactured thereby due to an imperfect fit between mating components of a molding die used therewith. Such discontinuity has the effect of breaching the sealing integrity of the interface between the closure and the container neck surface. Thus, it is desirable to provide a container having a substantially continuous neck finish for engaging a closure sealing bead. It is also desirable to provide a mold for forming a container having a substantially continuous neck finish.

Containers are known which include a lip at an upper terminal end thereof which extends downwardly therefrom through a small distance and which is free from such discontinuity. However, it is furthermore desirable to provide an extended surface free from such discontinuity with which a closure sealing bead may mate to form an enhanced seal therebetween.

U.S. Pat. No. 4,134,513 to Mumford teaches a child-resistance safety closure for use on a container having a neck portion with a smooth finish. It is furthermore desirable to provide the mold by which such a container is made.

SUMMARY OF THE INVENTION

It is an object of the present invention to provide a mold for forming a container, wherein a container formed therefrom includes a substantially continuous neck finish.

A mold for forming a container is provided with an upper die, a lower die, a first semi-cylindrically shaped collar and a second semi-cylindrically shaped collar. The upper die includes a downwardly-depending central core portion which cooperates with a concentric annular lip portion and spaced outwardly from the central core portion defining a groove therebetween sized to provide a continuous neck finish on the container. The lower die is provided with a core-receiving pocket sized to receive the central core portion of the upper die. The first and second collars are disposed in abutting relation and are provided with mating surfaces having thread grooves to form a thread region of the container neck, the first and second collars being sandwiched between the upper and lower dies in a use condition.

BRIEF DESCRIPTION OF THE DRAWINGS

A better understanding of the present invention will be had upon reference to the following description in conjunction with the accompanying drawings in which like numerals refer to like parts, and wherein.

DETAILED DESCRIPTION OF THE PREFERRED EMBODIMENT

Figure 1:
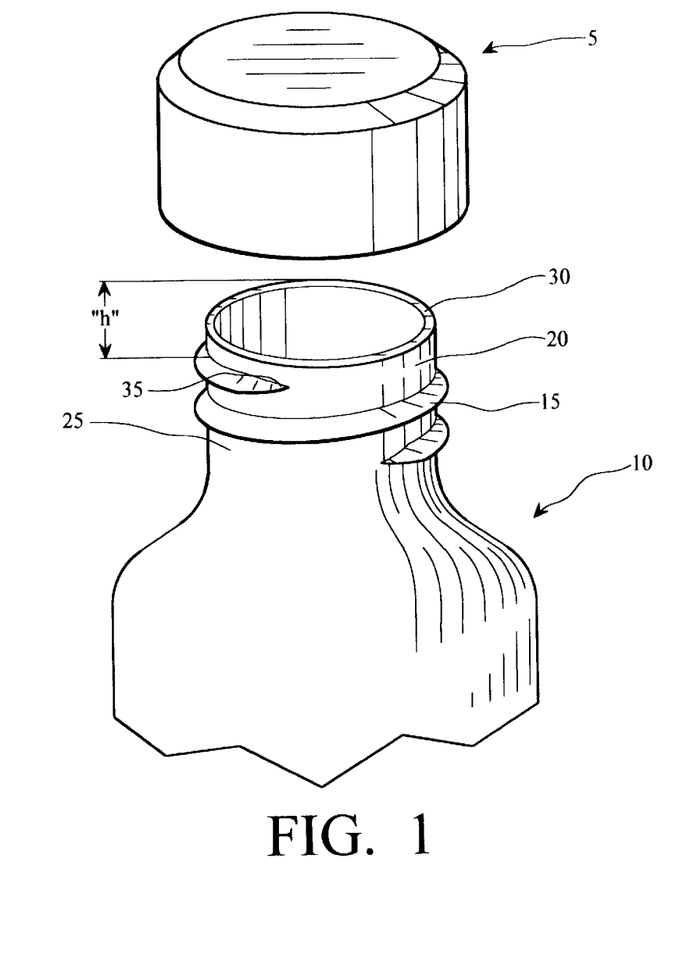
FIG. 1 is a perspective view of a top of a container neck formed from a mold according to a preferred embodiment of the present invention shown with a top of a closure.

With reference to FIG. 1, a container 10 formed from a mold (FIG. 2) according to the preferred embodiment of the present invention is shown with a closure 5. The container 10 includes an external thread 15 provided on an outer surface 20 of the container neck 25 sized to engage an internal thread (not shown) provided on an inner surface of the closure 5. The container neck 25 includes a terminal end 30 and a bead-receiving area "h" between the terminal end 30 and a trailing end 35 of the external thread 15. The bead-receiving area "h" is sized to receive a sealing bead (not shown) provided on the inner surface of the closure 5. The container 10 is preferably made from a suitable lightweight polymer, such as, for example, polyethylene polypropylene or polyethylene terephthalate, although substitutions may be made in place thereof without departing from the spirit or scope of the present invention.

Figure 2:
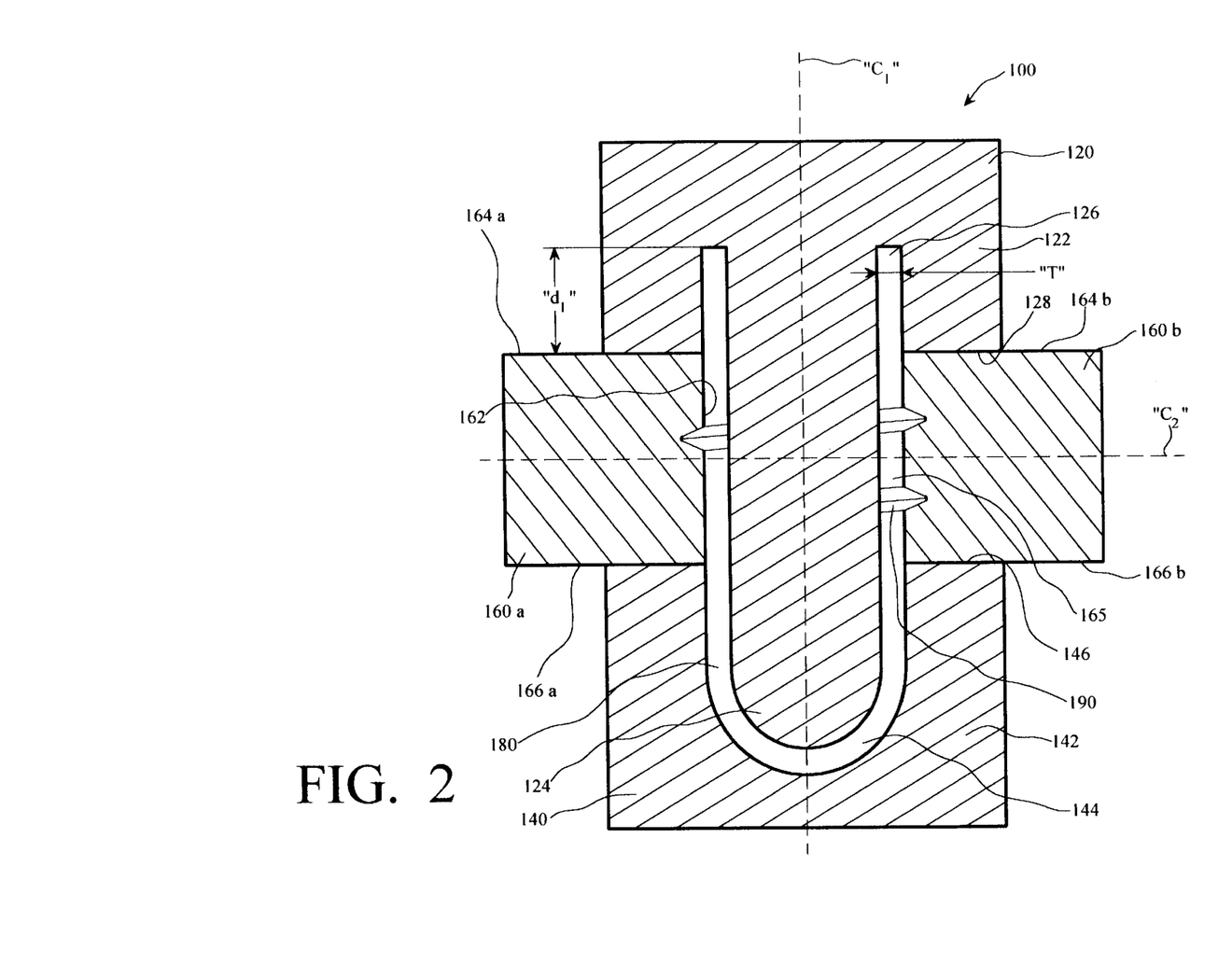
FIG. 2 is a sectional view of a mold for forming the container of FIG. 1.

With reference to FIG. 2, a container-molding die assembly 100 is shown. Assembly 100 includes an upper die 120, a lower die 140, a first semi-cylindrically shaped collar 160a and a second semi-cylindrically shaped collar 160b, all of which cooperate to define a recess 180 corresponding to the desired shape of the container 10. The upper die 120 and the lower die 140 are linearly moveable along a central axis "$C_1$" of the recess 180.

Figure 3:
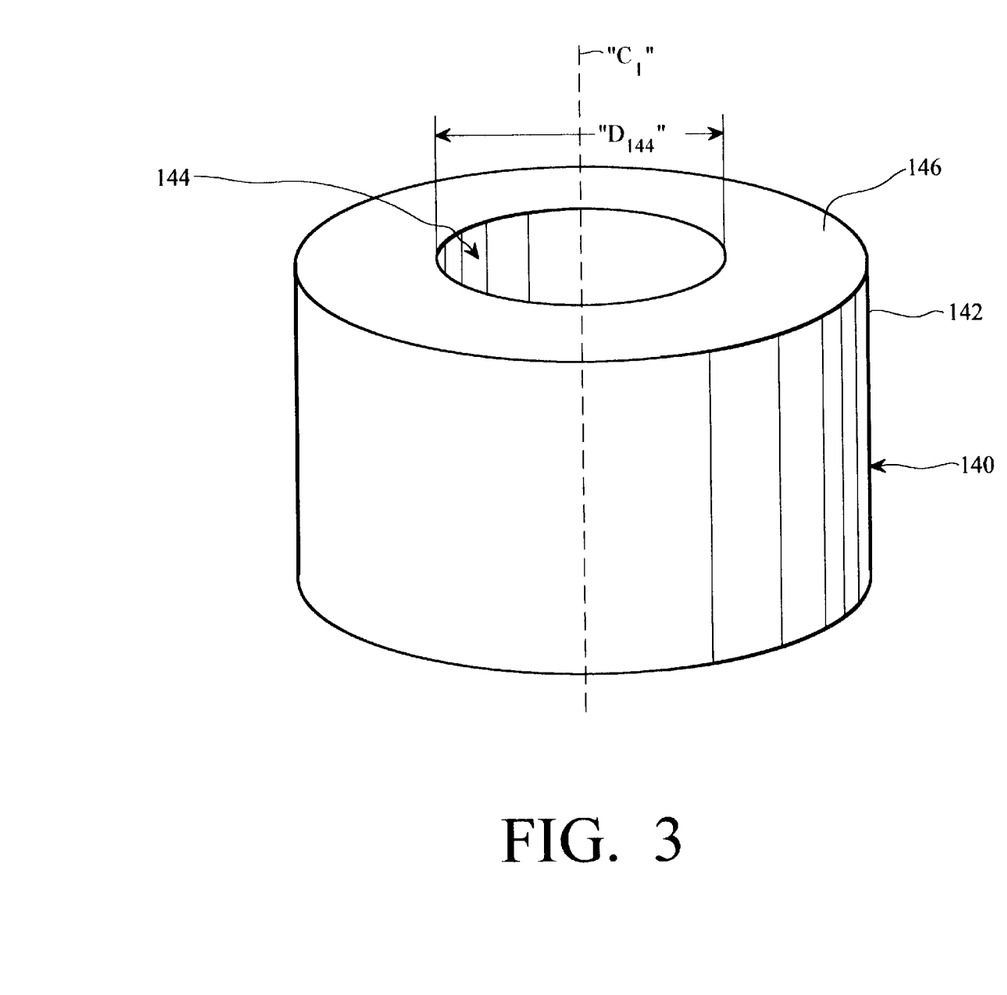
FIG. 3 is a perspective view of one element of the mold of FIG. 2.

With additional reference to FIG. 3, the lower die 140 includes an upwardly-projecting wall portion 142 disposed coaxially with and outwardly from the central axis "$C_1$" thereby defining a core-receiving pocket 144 having a diameter "$D_{144}$". The core-receiving pocket 144 may be of any desired shape for the final shape and appearance of the container 10. The particular embodiment shown illustrates a pre-finished container shape commonly referred to as a "preform", which may later be shaped to match the particular desired appearance for the container 10, such as, for example, by inserting the preform into another die having an interior contour matching the desired appearance of the container and inflating an interior portion of the preform with high-pressure air until the preform conforms to the interior contour of the die.

Figure 4:
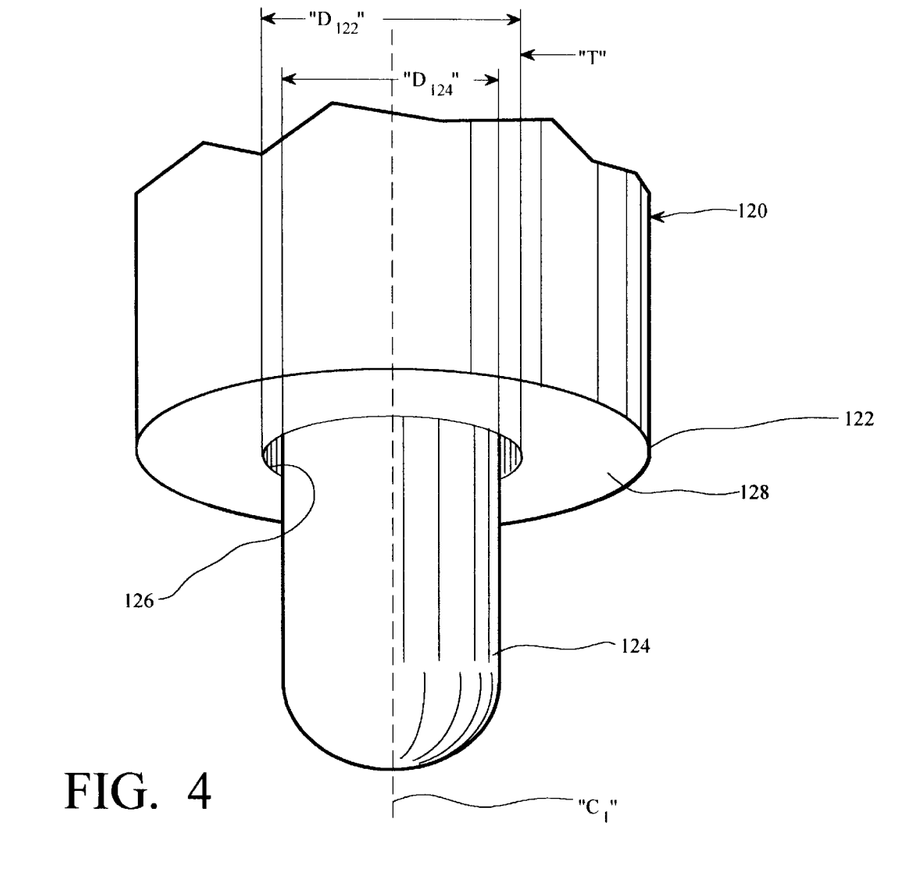
FIG. 4 is a perspective view of another element of the mold of FIG. 2.

With combined reference to FIGS. 2 and 4, an annular lip portion 122 depends downwardly from the upper die 120 through a first preselected distance "$d_1$" and is disposed coaxially with and outwardly from the central axis "$C_1$". Annular lip portion 122 includes an inner surface diameter "$D_{122}$" having substantially the same value as core-receiving pocket diameter "$D_{144}$". The distance "$d_1$" is sized to fully provide a continuous molded outer surface of the container neck 6 within the bead-receiving region "h", such as, for example, a distance greater than about 0.032 inches.

A central core portion 124 of the upper die 120 depends downwardly from the upper die 120 through a second preselected distance along the central axis "$C_1$" and projects into the core-receiving pocket 144 of the lower die 140. Central core portion 124 includes an outer surface diameter "$D_{124}$" having a value less than annular lip portion inner surface diameter "$D_{122}$" by an amount "T", which corresponds to a desired thickness of an annular groove 126 defined in the upper die 120 by the cooperation of the lip portion 122 and the core portion 124.

Figure 5:
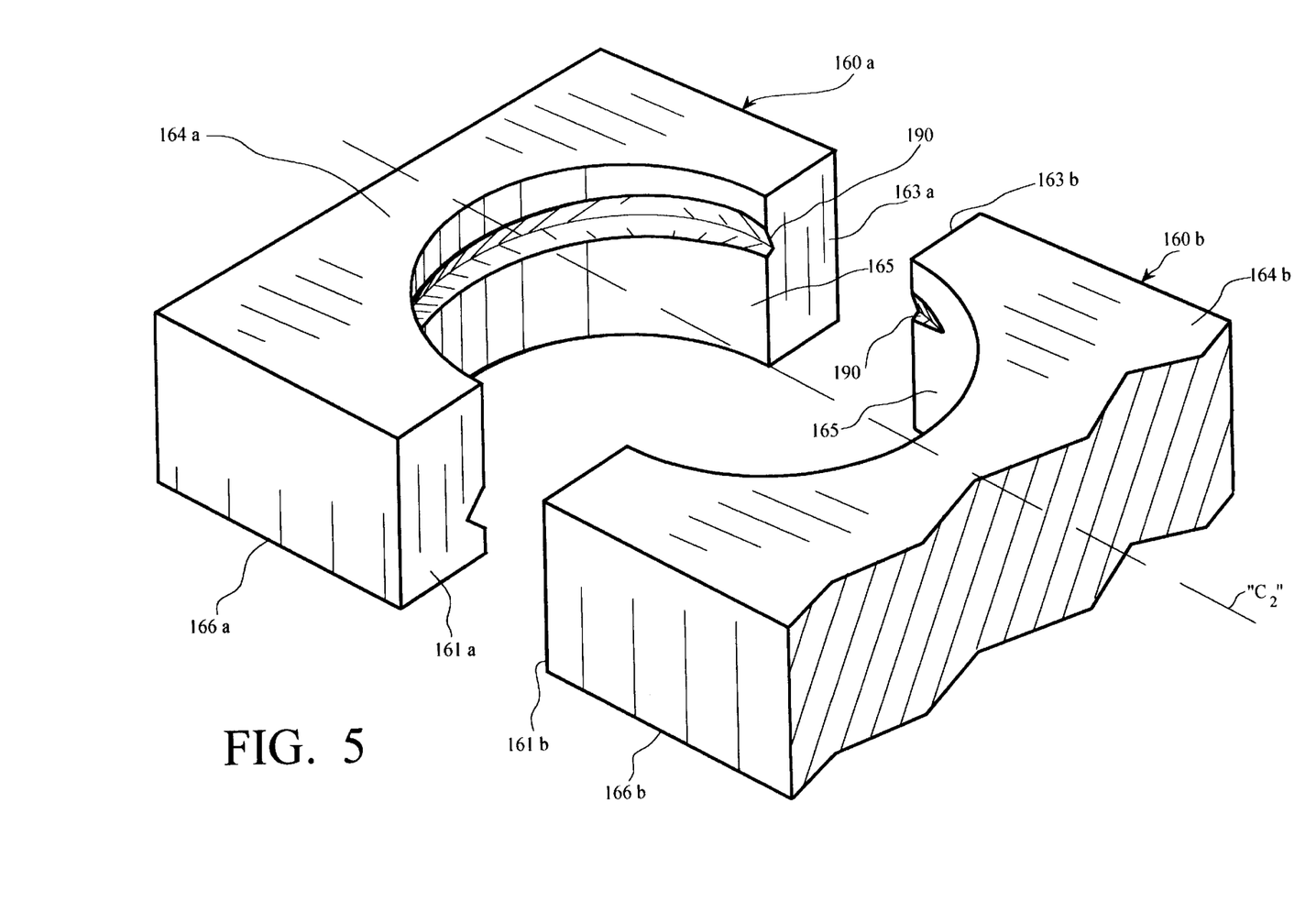
FIG. 5 is a perspective view of two other elements of the mold of FIG. 2 shown in spaced relation to one another.
Figure 6:
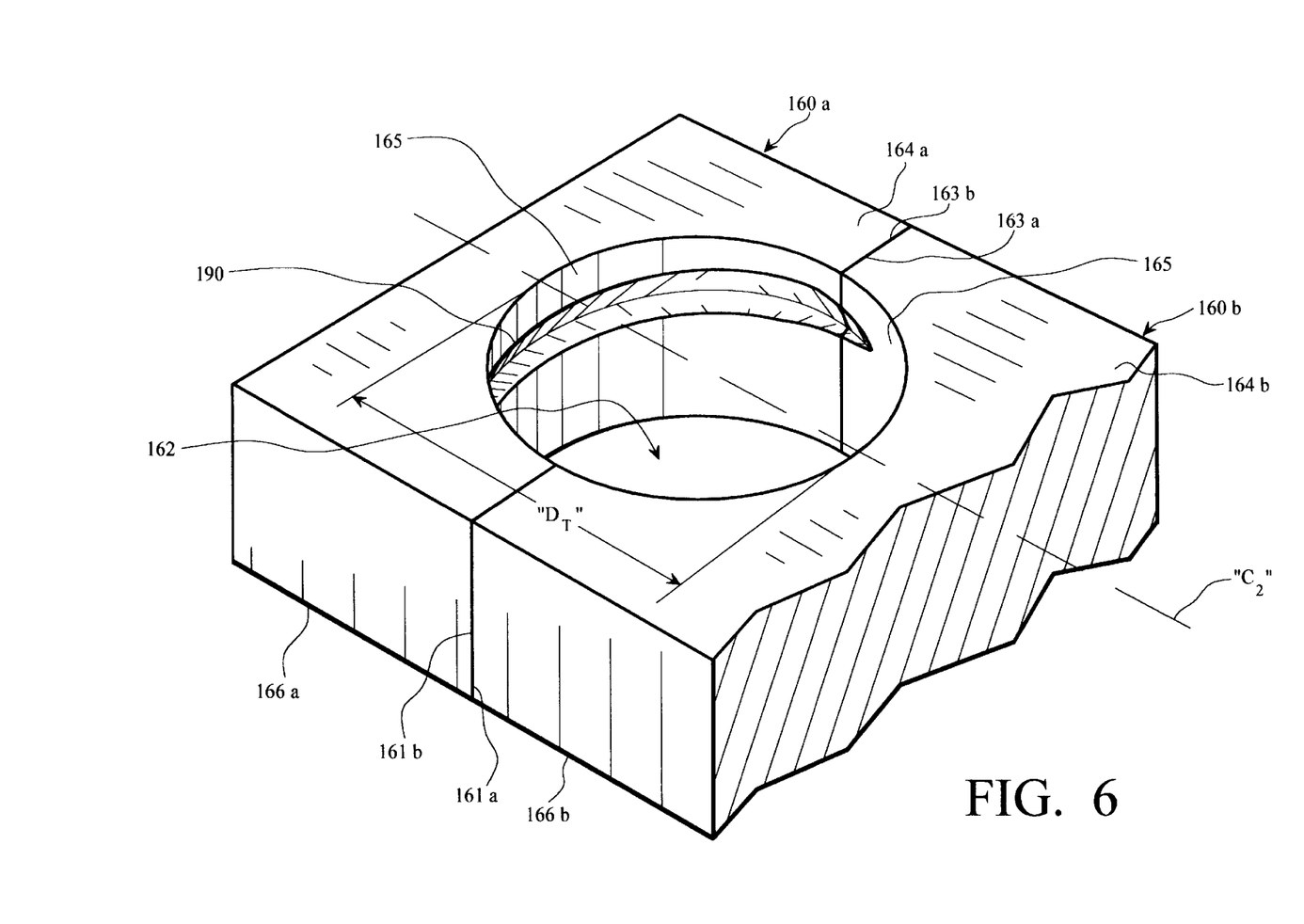
FIG. 6 is a perspective view of the elements of the mold of FIG. 5 shown in abutting relation to one another; and, FIG. 7 is a sectional view of a mold for forming a container of FIG. 1 according to another embodiment of the present invention.

With combined reference to FIGS. 5 and 6, the first and second collars 160a and 160b are linearly moveable along an axis "$C_2$" normal to the central axis "$C_1$" of the recess 180 and cooperate to form a substantially continuous mating surface 165 including a diameter "$D_T$" having substantially the same value as core receiving pocket diameter "$D_{144}$" and substantially the same value as annular lip portion inner diameter "$D_{122}$". The mating surface 165 is provided with means for forming a closure-retaining means, such as, for example, a helical thread or a continuous sealing bead. Preferably, the first and second collars 160a and 160b define a mating surface 165 having a groove 190 therein shaped to form an external helical thread 15 (FIG. 1) on the container neck 6 (FIG. 1). Alternatively, first and second collars 160a and 160b may be replaced by a plurality of collars (not shown) all of which cooperate to form the mating surface 165.

In operation, the container neck 6 is molded by the first and second collars 160a and 160b moving inwardly along axis "$C_2$" until opposing faces thereof 161a and 161b, respectively, and 163a and 163b, respectively, abut one another, thereby defining the substantially continuous mating surface 165.

With combined reference to FIGS. 2 and 4, the upper die 120 is moved downwardly through a circular opening 162 defined by the mating surface 165 of the abutting first and second collars 160a and 160b until a lower surface 128 of the upper die 120 abuts upper surfaces 164a and 164b of the first and second collars 160a and 160b, respectively.

With combined reference to FIGS. 2 and 3, the lower die 140 is moved upwardly until an upper surface 146 of the lower die 140 abuts lower surfaces 166a and 166b of the first and second collars 160a and 160b, respectively.

Liquid container material, such as, for example, polyethylene, polypropylene, or polyethylene terephthalate is interposed, such as, for example, by injection or extrusion, into the recess 180 and allowed to set. The first collar 160a, the second collar 160b and the upper die 120 are withdrawn to expose the formed container 10. Any suitable means of removing the container 10 from the upper die 120, such as, for example, by a blast of high pressure air, may be used.

Figure 7:
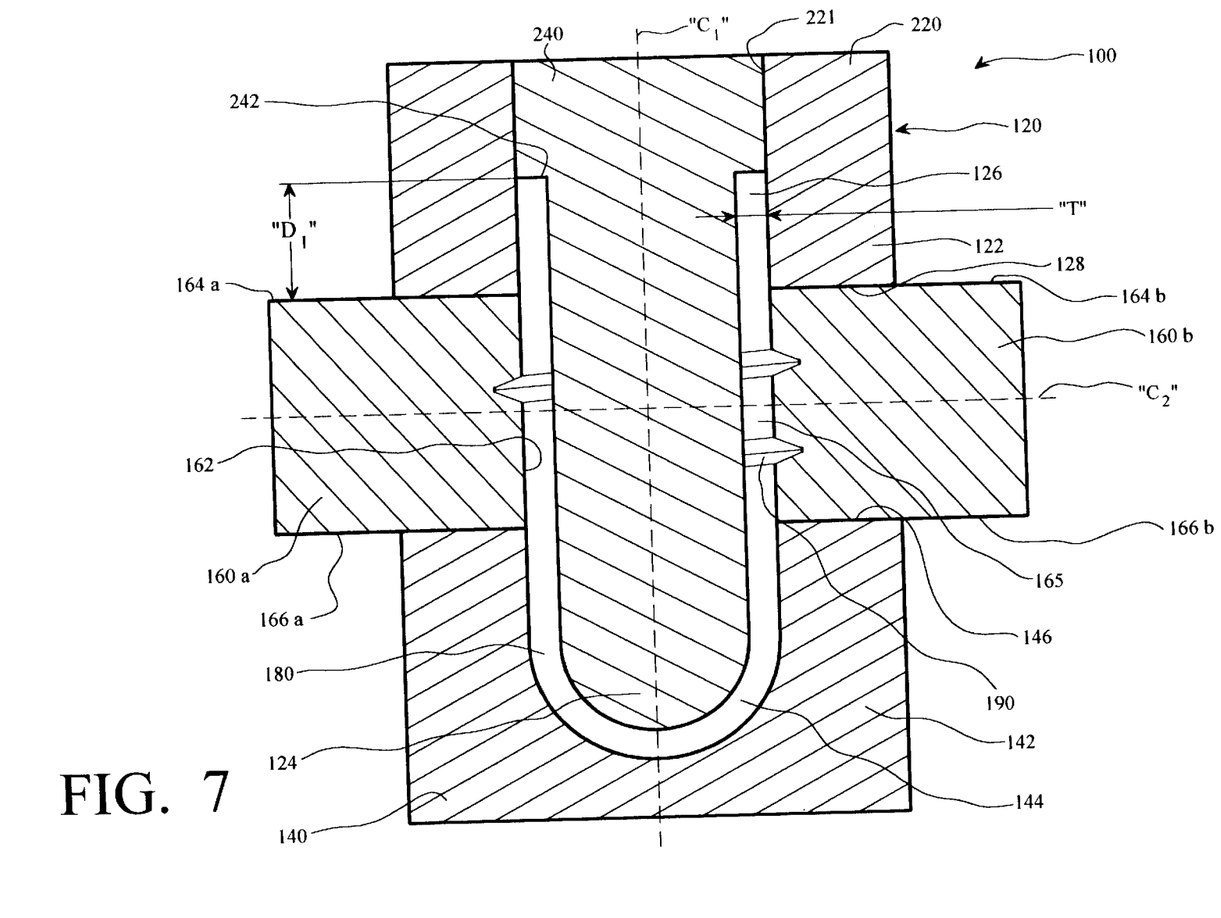

With reference to FIG. 7, another embodiment of the present invention is shown having many components in similar to a mold according to the preferred embodiment hereinabove described, wherein like numeral represent like components. The upper die 120 includes an outer cylindrical sleeve 220 disposed along the longitudinal axis "$C_1$" and having a core-receiving bore 221 provided coextensively and coaxially therewith. The outer cylindrical sleeve 220 defines the lip portion 122 of the upper die 120. The upper die 120 further includes an inner cylindrical core 240 disposed coaxially within the core-receiving bore 221 and slidingly engageable therewith along longitudinal axis "$C_1$". The cylindrical core includes an annular lip 242 extending radially outwardly therefrom.

The foregoing detailed description is given primarily for clearness and understanding and no unnecessary limitations are to be understood therefrom for modifications will become obvious to those skilled in the art upon reading this disclosure and may be made without departing from the spirit of the present invention.

I claim:

1. A method for forming a container including a substantially cylindrical neck portion having an open end thereof and a body portion having a closed lower end thereof, said neck portion having a substantially constant cross-section and a substantially continuous neck finish, said method comprising the steps of:

providing a mold having (a) an upper die linearly moveable along a first axis, said upper die including an annular lip portion depending downwardly therefrom a first preselected distance sufficient to fully provide a continuous molded surface in a sealing bead receiving area and an inner concentric central core disposed coaxially within a bore in said upper die and slidingly engageable therein depending downwardly therefrom a second preselected distance, said second preselected distance being greater than said first preselected distance, said lip portion being in substantially constant spaced relation around said central core thereby defining a concentric cylindrical groove therebetween, said groove having a substantially constant cross-section, (b) a lower die linearly moveable along said first axis including an upwardly-projecting wall portion defining a concentric core-receiving pocket sized to receive said upper die central core wherein said upper die central core cooperates with said lower die core-receiving pocket to define said closed lower end of said container body portion, (c) a first semi-cylindrically shaped collar linearly moveable along a second axis normal to said first axis, said first collar including a first mating surface, and, (d) a second semi-cylindrically shaped collar linearly moveable along said second axis, said second collar including a second mating surface;

moving said first collar and said second collar inwardly toward one another along said second axis until said first mating surface is in abutting relation with said second mating surface;

moving said upper die downwardly along said first axis until a lower terminating end of said upper die is in abutting relation with respective upper surfaces of said first and said second collars, said upper die central core extending downwardly between respective mating surface of said first and said second collars;

moving said lower die upwardly along said first axis until a lower terminating end of said lower die is in abutting relation with respective lower surfaces of said first and said second collars, said lower die concentric core-receiving pocket receiving said upper die central core;

providing a source of molten container material;

interposing said molten container material into a recess defined by said upper die concentric groove, said first collar mating surface, said second collar mating surface, an inner surface of said lower die core-receiving pocket and said outer surface of said upper die central core;

cooling said molten container material to a temperature sufficient to define a container;

moving said first collar and said second collar outwardly away from one another along said second axis;

moving said lower die downwardly along said first axis;

removing said container from said die.

2. A mold for forming a container including a substantially cylindrical neck portion having an open end thereof and a body portion having a closed lower end thereof, said neck portion having a substantially constant cross-section and a substantially continuous neck finish, said mold comprising:

an upper die including an annular lip portion depending downwardly therefrom a first preselected distance and an inner concentric central core disposed coaxially within a bore in said upper die and slidingly engageable therein depending downwardly therefrom a second preselected distance, said second preselected distance being greater than said first preselected distance, said lip portion being in substantially constant spaced relation around said central core thereby defining a concentric cylindrical groove therebetween, said groove having a substantially constant cross-section, said first preselected distance being sufficient to fully provide a continuous cylindrical molded outer surface in a sealing bead receiving area;

a lower die including an upwardly-projecting wall portion defining a concentric core-receiving pocket sized to receive said upper die central core wherein said upper die central core cooperates with said lower die core-receiving pocket to define said closed lower end of said container body portion;

a first semi-cylindrically shaped collar including a first mating surface; and, a second semi-cylindrically shaped collar including a second mating surface sized to engage said first mating surface to provide a continuous molding surface surrounding said central core and spaced therefrom, said first and said second collars being in abutting relation and having opposed outer surfaces providing a top surface in abutting relation with a lower terminating end of said lip portion and a bottom surface in abutting relation with an upper terminating end of said wall portion of said lower die.

3. The mold according to claim 2, wherein:

said first mating surface further includes means for forming a first container-retaining means; and, said second mating surface further includes a means for forming a second container-retaining means, said second container-retaining means cooperating with said first container-retaining means to provide means for forming a container-retaining means.

4. The mold according to claim 3, wherein:

said first container-retaining means being a first helical thread-forming groove; and, said second container-retaining means being a second helical thread-forming groove.

5. The mold according to claim 3, wherein:

said first container-retaining means being a first arcuate bead-forming groove; and, said second container-retaining means being a second arcuate bead-forming groove.

* * * * *